United States Patent
Tufariello (12) 
(10) Patent No.: US 6,305,092 B1
(45) Date of Patent: *Oct. 23, 2001

(54) LEVEL WITH PLUMB ALIGNMENT FEATURES

(76) Inventor: Michael F. Tufariello, 9 White Birch Terr., Caldwell, NJ (US) 07006

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,886

(22) Filed: Nov. 16, 1998

(51) Int. Cl.$^7$ ........................................ G01C 9/26
(52) U.S. Cl. ............................... 33/371; 33/451
(58) Field of Search ..................... 33/371, 374, 376, 33/382, 384, 451, 465, 468, 613

(56) References Cited

U.S. PATENT DOCUMENTS

| | | |
|---|---|---|
| 339,158 | 4/1886 | Finley . |
| 339,287 | 4/1886 | Gates . |
| 704,369 * | 7/1902 | Pritt ............................. 33/451 |
| 813,173 * | 2/1906 | Realing ......................... 33/376 |
| 988,888 | 4/1911 | Meier et al. . |
| 1,142,418 | 6/1915 | Hamalainen . |
| 1,160,920 * | 1/1915 | Lucas ........................... 33/451 |
| 1,221,777 | 4/1917 | Uney . |
| 1,276,961 | 8/1918 | Roach . |
| 1,489,239 | 4/1924 | Eagan . |
| 2,265,695 * | 12/1941 | Lee ............................... 33/468 |
| 2,741,030 | 4/1956 | Wise . |
| 2,745,183 | 5/1956 | Pe Queen . |
| 2,752,692 | 7/1956 | Smith . |
| 2,807,888 | 10/1957 | Thomas . |
| 2,875,523 | 3/1959 | Fay . |
| 2,946,131 | 7/1960 | King . |
| 3,345,750 | 10/1967 | Hill . |
| 4,327,501 | 5/1982 | Hurt . |
| 4,617,820 | 10/1986 | Hammond . |
| 4,693,011 * | 9/1987 | Strayham ...................... 33/382 |
| 4,910,876 | 3/1990 | Channell . |
| 4,955,141 | 9/1990 | Welch . |
| 5,088,205 * | 2/1992 | Egbert .......................... 33/371 |
| 5,208,990 * | 5/1993 | Woerlein ....................... 33/382 |
| 5,353,509 | 10/1994 | Black . |
| 5,471,760 * | 12/1995 | Farris ............................ 33/613 |
| 5,832,618 * | 11/1998 | Scarborough ................. 33/464 |
| 5,915,806 * | 6/1999 | Levee ........................... 33/468 |
| 6,029,362 * | 2/2000 | Miodragovic ................. 33/613 |
| 6,049,991 * | 4/2000 | Gruenberg et al. ........... 33/613 |

* cited by examiner

*Primary Examiner*—G. Bradley Bennett
(74) *Attorney, Agent, or Firm*—Anthony J. Casella; Gerald E. Hespos (57) ABSTRACT

A level apparatus is provided with an elongate level and a support. The level and the support each have opposed ends, front and rear faces and top and bottom faces. The top and bottom faces of the support are substantially planar and parallel to one another, and the top and bottom faces of the level are substantially planar and parallel to one another. A central position on the support is pivotally connected to the level such that the rear face of the support is in opposed facing relationship to the front face of the level. The level can be used in a conventional manner without utilizing the support. However, the support can be pivoted relative to the level into an orientation where the top or bottom face of the support can be positioned on the upper face of a beam such that the level extends downwardly from the support and the beam. The level then can be used to define a plumb line to which other structural elements can be positioned or compared.

17 Claims, 5 Drawing Sheets

LEVEL WITH PLUMB ALIGNMENT FEATURES

BACKGROUND OF THE INVENTION

1. Field of the Invention

The subject invention relates to a level that can be used to achieve a specified alignment between two structural elements.

2. Description of the Prior Art

A typical carpenter's level is an elongated generally rectangular structure having opposed first and second ends. Planar top and bottom faces are aligned parallel to one another and extend between the ends. The top and bottom faces are the portions of the prior art level that will be placed against another surface for assessing horizontal or vertical alignment. The prior art level also has a front face and a rear face that connect the top and bottom faces and the respective ends. The front and rear face on most prior art levels also are parallel to one another. However, the prior art does include torpedo levels that have the front and rear faces tapering towards one another in proximity to the respective ends of the level. Other prior art levels have recessed front and rear faces so that the level has a cross-section that resembles an I-beam.

A typical prior art level includes a plurality of glass tubes that are partly filled with a liquid spirit. The portion of the tube that is not filled by the liquid forms a bubble. Movement of the level will cause the liquid to gravitationally shift within the tube, and hence will cause a repositioning of the bubble. The tube includes a pair of lines that are spaced apart a distance approximately equal to the length of the bubble. When the tube is aligned horizontally, the liquid will be disposed symmetrically relative to the lines on the tube, and the bubble will be positioned precisely between the lines. The typical prior art level includes at least a first tube aligned parallel to the top and bottom faces of the level, and at least a second tube aligned perpendicular to the top and bottom faces of the level.

The prior art level can be used by placing the top or bottom face of the level on a substantially horizontal surface. The relative position of the bubble in the first tube provides an indication of the closeness of the level to a horizontal alignment. The surface on which the level is supported may be adjusted to precisely position the bubble between the lines of the first tube, and to thereby achieve a fairly exact horizontal alignment of the surface on which the level is supported.

The prior art level also may be used by positioning the top or bottom surface of the level on a substantially vertical surface. The relative position of the bubble in the second tube provides an indication of the degree of verticality of the surface against which the level is supported. The structural member against which the level is supported may be adjusted until the bubble is precisely positioned between the lines of the second tube, thereby ensuring an accurate vertical alignment.

Virtually all carpenters and home owners have at least one good quality level that is used frequently during any construction or repair project. For example, levels are used to ensure an accurate horizontal alignment of floor beams and to achieve an accurate vertical alignment of wall studs. Horizontal alignment of a structural member can be achieved more easily than vertical alignment. In particular, horizontal alignment of a beam can be achieved by merely placing the top or bottom face of the level on a substantially horizontal surface of the beam. The worker then can use both hands to adjust the relative height of one end of the horizontal beam by using shims or the like. Both hands then can be used to secure the beam in the precise horizontal orientation. Vertical alignment of a beam requires the worker to hold the level against a substantially vertical surface with one hand while the other hand is used to shift an end of the generally vertical beam. The worker may mark the position of the adjusted end of the beam on an adjacent surface once a substantially vertical alignment has been achieved. The worker then moves the level to a location where the level can be self-supporting and then uses both hands to affix the adjusted end of the beam. The worker then must check the vertical beam in this at least temporarily affixed position to ensure that the initial one-handed marking was accurate. Further adjustments may be required.

Carpenters also use squares for measuring perpendicularity of two structural members. The typical prior art square is formed from a rigid material with two legs that are precisely perpendicular to one another. The material of the prior art square typically is very thin (e.g., one-eighth inch). Each leg, however, will be approximately 1.0–2.0 inches wide. The prior art square can be used to check perpendicularity of an inside corner or an outside corner formed by two beams or other structural elements. This checking of perpendicularity of an inside corner is achieved by urging the thin outside edges of the prior art square into an inside corner between two structural elements. A perfect seating of the outside edges against the inside surfaces of the structural elements indicates precise perpendicularity. An improper fitting indicates further adjustments to one or the other of the structural elements is required.

The inside corners of the prior art level can be used in a similar manner to check the perpendicularity of an outside corner of two beams or other structural elements. In particular, the thin inside edges of the prior art square can be urged against the outside corner surfaces of the structural elements. Perfect seating of the thin inside edges of the prior art square against the surfaces of the structural elements indicates precise perpendicularity. An improper seating of the thin inside edges indicates that adjustments to one or the other structural element is necessary.

The thin perpendicularly aligned edges of a square that are used to check perpendicularity are not very stable Furthermore, the sharp outside corner of the prior art square can easily cut a worker if the square is dropped. As a result, the above-described prior art squares typically are held by the worker at all times during use and are carefully supported in a safe location when they are not being used.

Some prior art tools incorporate levels into a square. A prior art tool of this type can be used, for example, to check the horizontal alignment of the top of a door jamb and simultaneously to check the perpendicularity of the sides of a door jamb to the top member.

Some prior art squares have the respective legs of the square articulated to one another. This enables the adjustable square to achieve or measure a non-perpendicular orientation between two beams or other structural elements. For example, such an adjustable square can be used to gauge an angle between a first roof rafter and a first floor joist. The adjusted square then can be moved to other locations for either comparing the angles between other roof rafters and floor joists or for setting other such angles. Some such prior art adjustable squares include a level in one or both of the pivotally connected legs. All such prior art squares are configured to be held by the worker against an inside corner or an outside corner as in the above-described conventional fixed right angle squares. More particularly, the axis of rotation of the two legs of these prior art adjustable squares extends substantially parallel to the surfaces of the legs of the squares that are positioned against the beams or other supporting elements. Thus, achieving a selected angular orientation becomes a very difficult task with such a prior art adjustable square. The worker must manually hold the adjustable square against inside or outside corners of the structural elements being aligned and then must make any adjustments to the structural elements that may be required. The making of adjustments to the structural elements requires the worker to deposit the adjustable square at a remote location while the end of at least one of the structural element is adjusted. The worker then retrieves the adjustable square and again checks the angular alignment. This process may have to be repeated several times before a proper alignment is achieved.

The prior art also includes large, complex and costly apparatus for aligning roof rafters. These complex and costly apparatus for aligning roof rafters have few if any other uses for general carpentry.

In view of the above, it is an object of the subject invention to provide a level with plumb alignment features that enables a worker to check and achieve selected angles between two structural members.

It is a another object of the subject invention to provide an alignment apparatus that can be used to achieve a plumb or vertical alignment of one structural member relative to a second structural member.

It is an additional object of the subject invention to provide an apparatus that can be used as a conventional carpenter's level for checking horizontal and vertical alignment.

It is yet a further object of the subject invention to provide a level apparatus of approximately the same size, weight and cost as a conventional carpenter's level.

SUMMARY OF THE INVENTION

The subject invention is directed to a level apparatus with alignment features. The apparatus includes an elongate carpenter's level having opposed first and second ends. Parallel planar top and bottom surfaces extend substantially continuously between the ends. Front and rear surfaces extend between the first and second ends and extend between the top and bottom surfaces. The front and rear surfaces may be parallel to one another.

The level may define any convenient length, and different embodiments may be of different respective lengths. A typical level in accordance with the subject invention will define a length of between 1.0–4.0 feet, however, a pocket size level of approximately 8–12 inches can be very useful. The height of the subject level, as measured between the parallel top and bottom surfaces, also will be approximately equal to the height of conventional prior art levels. Thus, the height typically will be between 1–4 inches and most typically 2–3 inches. The thickness of the level, as measured between the opposed front and rear faces, also will be approximately the dimensions of a conventional prior art level. Thus, the level of the subject invention preferably will define a thickness of between 0.5–1.5 inch, and most preferably approximately 0.75–1.0 inch.

The level further includes a plurality of tubes containing a sufficient amount of a liquid or spirit to retain a bubble in the tube. At least a first tube has a longitudinal axis aligned substantially parallel to the top and bottom surfaces of the level, and at least a second tube has a longitudinal axis aligned substantially perpendicular to the top and bottom surfaces of the level. Thus, as in the prior art, the first tube can be used to check the horizontal alignment of a surface on which the top or bottom surface of the level is supported. The second tube can be used to check the vertical alignment of a surface against which the top or bottom surface of the level is supported.

The subject apparatus further includes a support member. The support member may be substantially rectangular, and may include opposed first and second ends. Opposed parallel top and bottom faces extend between the first and second ends of the support member. Opposed front and rear faces extend between and connect the first and second ends of the support member and the top and bottom faces thereof. The support member has a length substantially shorter than the length of the level, and preferably defines a length of between 4–8 inches, and most preferably about 6 inches. The support member defines a height, as measured between the parallel top and bottom faces, that is no greater than the height of the level, and that preferably is slightly less than the height of the level. The support member further defines a thickness, as measured between the front and rear faces that may be approximately the same as the thickness of the level. More particularly, the support member may define a thickness between approximately 0.5–1.5 inch, and preferably 0.75–1.0 inch. The thickness of the support member is important to the supporting function of the support member as described in greater detail below.

The support member is pivotally connected to the level at a location substantially midway between the first and second ends of the support member and at a location that preferably is closer to the first end of the level than to the second end. More particularly, the pivot point between the support member and the level preferably is spaced from the first end of the level by a distance equal to or slightly greater than one-half the length of the support member. The pivot point between the level and the support member defines a pivot axis oriented to extend perpendicularly to the front and rear faces of the level and perpendicularly to the front and rear faces of the support member. Additionally the pivot axis is substantially parallel to the planar top and bottom faces of both the level and the support member. Thus, the front or rear face of the support member is slidably positioned adjacent the front or rear face of the level.

The face of the level to which the support member is pivoted may be provided with angle indicating indicia. The indicia may be operative to identify particularly angular orientations between the top and bottom faces of the support member and the top and bottom faces of the level. Additionally, the pivotal connection of the support member to the level may include structure for releasably affixing the support member in a selected angular orientation. This pivotal connection may include a conventional threadedly tightenable nut, a spring to bias the level and support member into a non-rotatable engagement and/or interengageable teeth for achieving at least one specified angle.

The apparatus may be used by loosening the pivotal connection of the support member to the level sufficiently to rotate the support member into a non-colinearly alignment relative to the level. For purposes of this discussion, it will be assumed that the bottom face of the support member is facing generally downwardly. The bottom face of the support member then may be placed on the top surface of a first structural element such that the second end of the level is suspended downwardly from the first structural element. The level then can be rotated until the second tube indicates a substantially vertical alignment. This alignment can be used to gauge a proper vertical alignment of a second structural element. The apparatus can be substantially self-supported in this aligning orientation by the support member gravitationally positioned on the upper surface of the first structural element to which other structural elements are being aligned. In some instances, such as in the erection of an interior wall or an exterior deck, the support member can be positioned on the top surface of a horizontal joist. The level then will be substantially perpendicular to the top and bottom faces of the support member and will be substantially plumb or vertical. Vertical studs in a wall or vertical supporting members for a deck then can be positioned relative to the horizontal joist and relative to the plumb line for vertical orientation indicated by the level.

In other instances, the apparatus can be used to set the rafters of a pitched roof. The apparatus is used by positioning the top or bottom face of the support member on a top face of the roof rafter. The level is permitted to swing pendulously from the support member and from the rafter and into a plumb or vertical orientation. The upper end of the first rafter may be adjusted until a specified angle is achieved. This angle can be measured by determining the angle between the vertically oriented level and the top or bottom face of the support member. The support member then can be tightened or otherwise affixed in the specified angle, and that angle can be used on other roof rafters to achieve the proper pitch. More particularly, the angularly fixed support member can be positioned on an upper surface of a roof rafter, and the upper end of the roof rafter can be adjusted until the level shows a vertical orientation. In a similar matter, the apparatus can be used to accurately align vertical support members or interior wall studs relative to a pitched rafter. More particularly, the support member can be supported on the top surface of a pitched roof rafter, and the vertically suspended level can be used for aligning vertical studs.

DETAILED DESCRIPTION OF THE PREFERRED EMBODIMENTS

A level apparatus in accordance with the subject invention is identified generally by the numeral 10 in FIGS. 1 and 6–13. The apparatus 10 includes a support 12, a level 14 and a connection assembly which, in this embodiment, comprises a bolt 16 and a nut 18.

Figure 1:
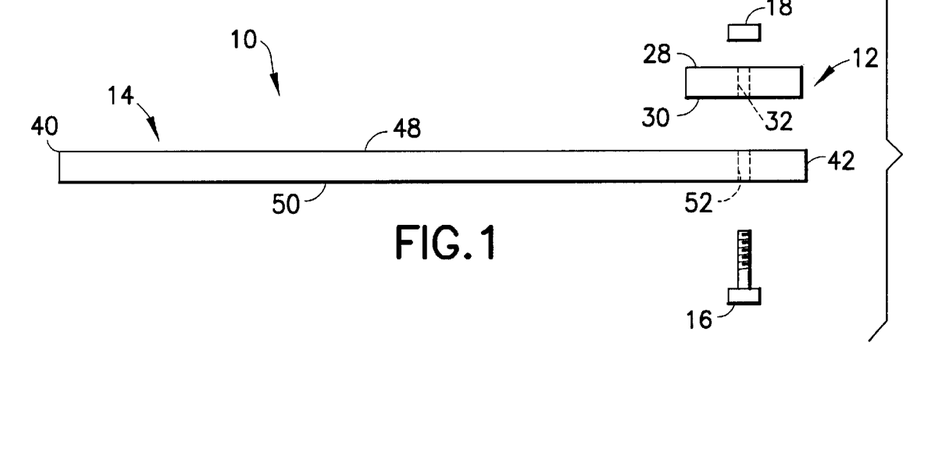
FIG. 1 is an exploded elevational view of a level apparatus in accordance with the subject invention.
Figure 2:
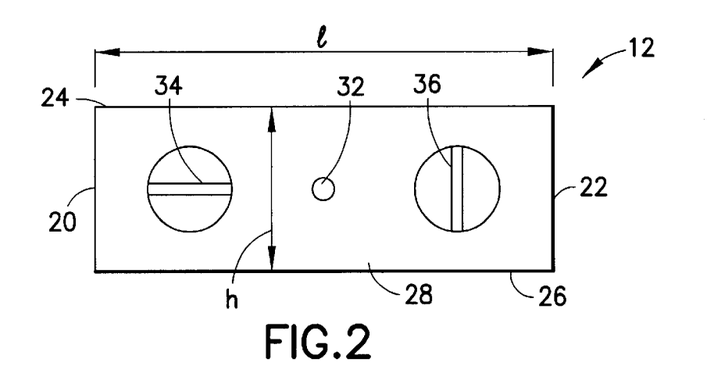
FIG. 2 is a front elevational view of the support for the level apparatus shown in FIG. 1.
Figure 3:
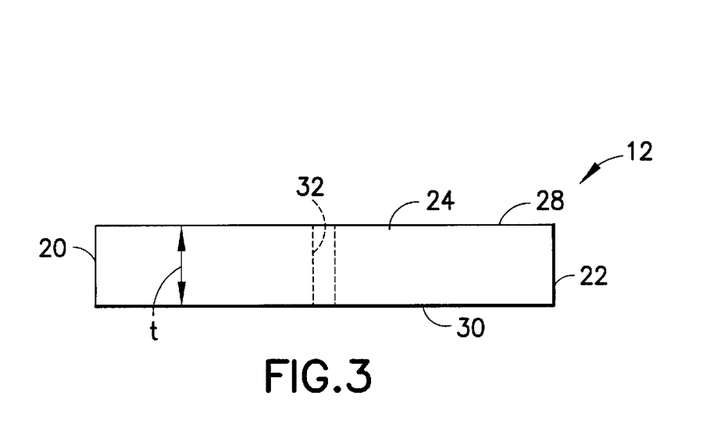
FIG. 3 is a top plan view of the support shown in FIG. 2.

The support 12, as shown most clearly in FIGS. 2 and 3, is a slightly elongated rectangular parallelepiped. The support 12 includes opposed first and second ends 20 and 22, a planar top face 24, a planar bottom face 26, a front face 28 and a rear face 30. The support 12 defines a longitudinal axis having a length "l" as measured between the ends 20 and 22 of approximately 6 inches, and a height "h" measured between the top and bottom faces 24 and 26 of approximately 2 inches. Additionally, the support 12 defines a thickness "t" between the front and rear faces 28 and 30 of approximately 1 inch.

A mounting aperture 32 extends completely through the support 12 from the front face 28 to the rear face 30 at a location disposed centrally between the first and second ends 20 and 22 and centrally between the top and bottom faces 24 and 26. In the embodiment shown herein, the support 12 further includes a pair of bubble tubes 34 and 36 that are aligned perpendicular to one another for indicating horizontal and vertical alignment respectively.

Figure 4:
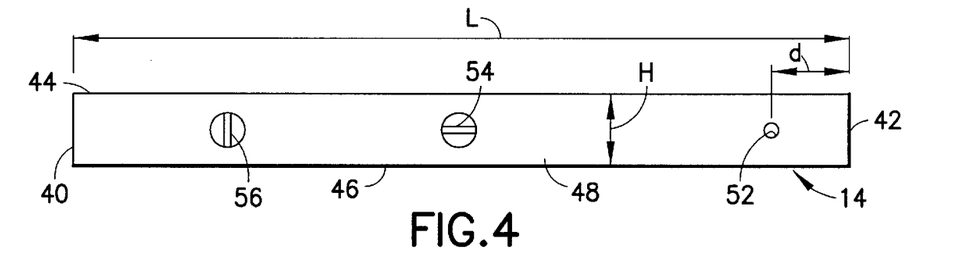
FIG. 4 is a front elevational view of the level shown in FIG. 1.
Figure 5:
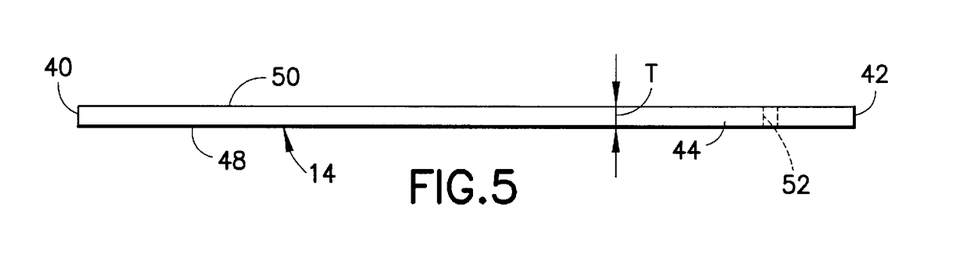
FIG. 5 is a top plan view of the level shown in FIG. 4.

A level 14, as shown in FIGS. 4 and 5, also is a rectangular parallelepiped, but is substantially longer than the support 12. More particularly, the level 14 includes a first end 40 and a second end 42. A longitudinal axis is considered to extend between the ends 40 and 42 and defines an overall length "L" for the level 14 that preferably is in the range of 2–4 feet. The level 14 further includes a planar top face 44 and a planar bottom face 46 that extend substantially parallel to one another between the first and second ends 40 and 42. The top and bottom faces 44 and 46 define a height "H" for the level 14 that is equal to or greater than the height "h" of the support 12. The level 14 further includes front and rear faces 48 and 50 which extend between and connect the ends 40 and 42 and the top and bottom faces 44 and 46. In the embodiment shown in FIGS. 1–13, the front and rear faces are substantially parallel and planar. In other embodiments, as shown, for example, in FIGS. 14–16, the front and rear faces may have non-planar shapes.

The level 14 is characterized further by a mounting aperture 52 extending entirely therethrough from the front face 48 to the rear face 50. The aperture 52 is disposed centrally between the top and bottom faces 44 and 46. However, the aperture 52 is much closer to the first end 40 of the level 14 than to the second end 42 thereof. In this regard, the aperture 52 is spaced from the first end 40 by a distance "d" which is equal to or slightly greater than one-half the length "l" of the support 12. The level 14 further includes at least a first bubble tube 54 having an axis aligned parallel to the length of the level 14, and at least a second bubble tube 56 having an axis aligned substantially orthogonal to the length of the level 14. The tubes 54 and 56 indicate relative horizontal and vertical orientations, as in prior art levels.

The support 12 is mounted to the level 14 by registering the respective mounting apertures 32 and 52 with one another. In this registered condition, the end 20 of the support 12 will be aligned with or spaced slightly inwardly from the end 40 of the level 14. Additionally, the top and bottom faces 24 and 26 of the support 12 will be aligned with or disposed inwardly from the corresponding top and bottom faces 44 and 46 of the level 14. The support 12 is secured to the level 14 in this registered condition by passing the bolt 16 through the registered apertures, and threading the nut 18 onto the bolt 16. As shown in the figures, and particularly FIG. 1, the bolt 16 defines a pivot axis that is aligned orthogonally to the longitudinal axes of the support 12 and level 14, orthogonally to the front and rear faces 28 and 30 of the support 12 and orthogonally to the front and rear faces 48 and 50 of the level 14. Additionally, the pivot axis defined by the bolt 16 is parallel to the planes defined by the top and bottom faces 24 and 26 of the support 12 and parallel to the planes defined by the top and bottom faces 44 and 46 of the level 14.

Figure 6:
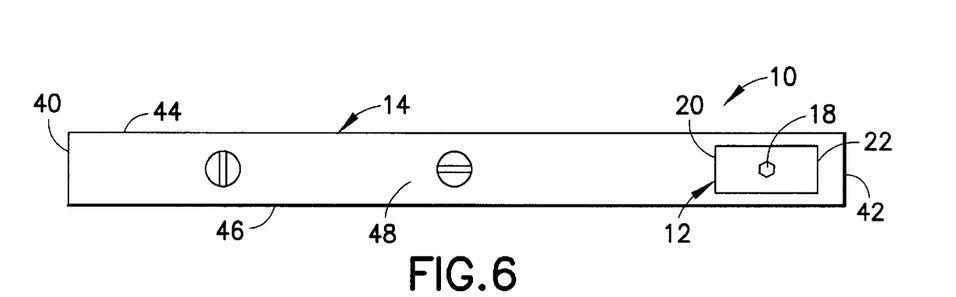
FIG. 6 is a front elevational view of the assembled level apparatus.
Figure 7:
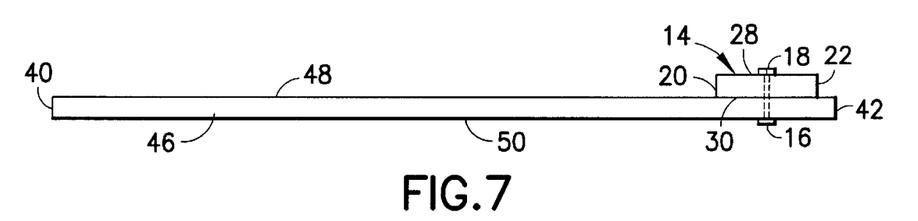
FIG. 7 is a bottom plan view of the assembled level apparatus shown in FIG. 6.
Figure 8:
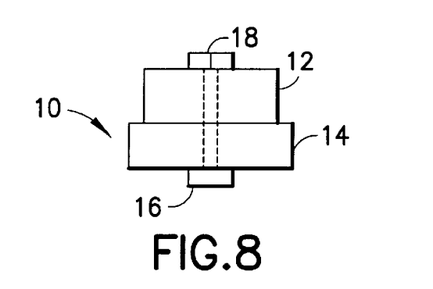
FIG. 8 is an end elevational view of the level apparatus shown in FIGS. 6 and 7.
Figure 9:
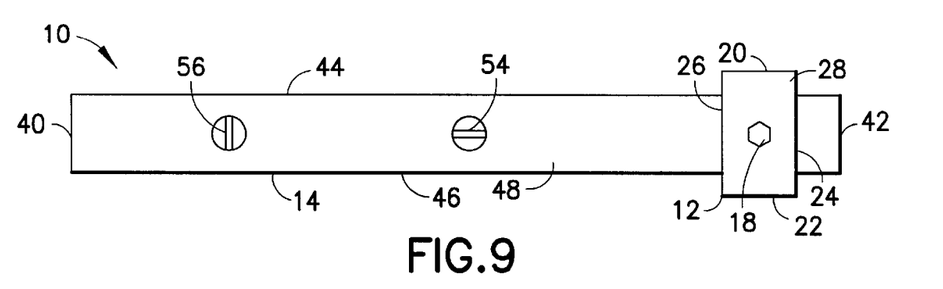
FIG. 9 is a front elevational view similar to FIG. 6, but showing the support in a different angular orientation.
Figure 10:
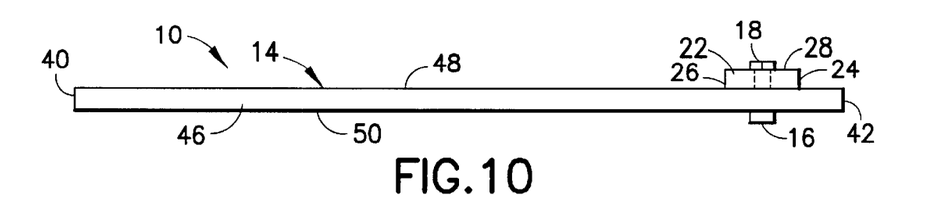
FIG. 10 is a bottom plan view similar to FIG. 7, but showing the support in the orientation of FIG. 9.

The pivotal connection of the support 12 to the level 14 enables the support 12 to be rotated about the pivot axis defined by the bolt 16 from the orientation shown in FIGS. 6–8 to the orientation shown in FIGS. 9 and 10, as well as any other angular orientation therebetween. More particularly, in the FIGS. 6–8 orientation, the top and bottom faces 24 and 26 of the support 12 are aligned parallel to the top and bottom faces 44 and 46 of the level 14, with the rear face 30 of the support 12 being in face-to-face engagement with the front face 48 of the level 14. In the FIGS. 9 and 10 orientation, the top and bottom faces 24 and 26 of the support 12 are perpendicular to the top and bottom faces 44 and 46 of the level 14. The support 12 can be fixed at a selected angular orientation relative to the level 14 by merely tightening the nut 18 on the bolt 16.

Figure 11:
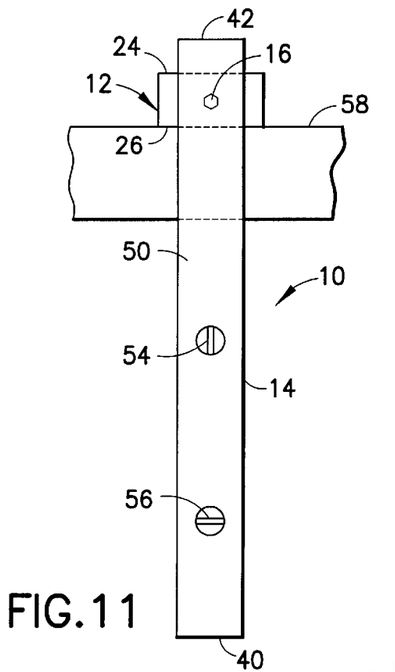
FIG. 11 is a front elevational view showing the level apparatus in the FIG. 9 orientation and mounted on a horizontal joist.
Figure 12:
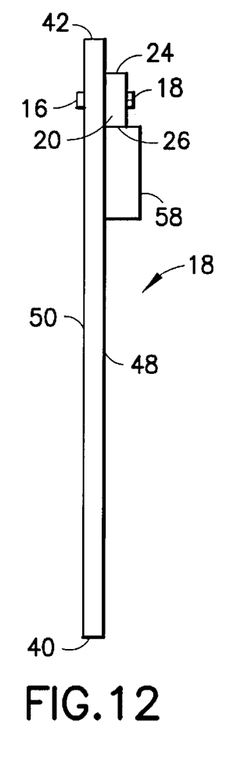
FIG. 12 is a cross-sectional view taken along line 12—12 in FIG. 11.

The apparatus 10 can be used, for example, as shown in FIGS. 11 and 12. More particularly, the support 12 can be rotated about the pivot axis of bolt 16 and into the orientation of FIGS. 9–12 where the top and bottom faces 24 and 26 of the support 12 are perpendicular to the top and bottom faces 44 and 46 of the level 14. The bottom face 26 of the support 12 then can be positioned on the top surface of a substantially horizontal beam 58. The support 12 has a sufficient thickness "t" as measured between the front and rear faces 28 and 30 for supporting the entire apparatus 10 from the beam 58. The second end 42 of the level 14 then is permitted to be suspended substantially vertically below the beam 58. Precise vertical orientation of the level 14 can be achieved by minor pivoting of the level 14 relative to the pivot axis defined by the bolt 16 and as indicated by the second bubble tube 56. The nut 18 then can be tightened to the bolt 16 for securely maintaining this vertical orientation of the level 14. A second beam (not shown) then can be positioned beneath the beam 58, with the axis of the second beam aligned substantially vertically with either face 44 or 46 of the level 14. This alignment can be achieved with relative ease by a single worker due to the relatively great thickness "t" of the support member 12 for pendulously supporting the apparatus 10 on the beam 58.

Figure 13:
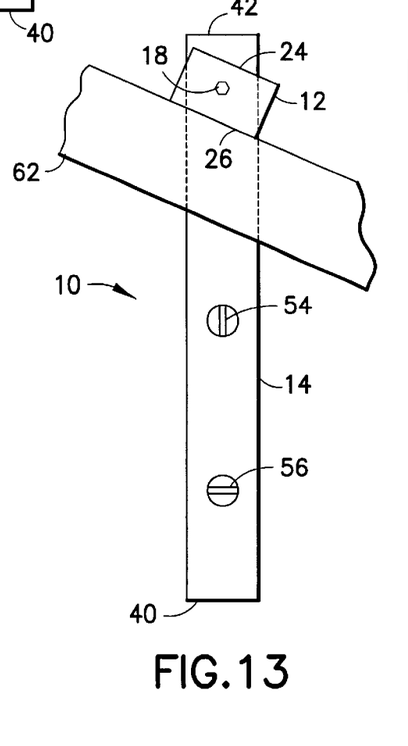
FIG. 13 is a front elevational view similar to FIG. 11, but showing the level apparatus used with a pitched drafter.

The apparatus 10 can be used in a slightly different manner, as shown in FIG. 13. More particularly, FIG. 13 shows a pitched rafter 62. The support 12 can be positioned on an upper surface of the pitched rafter 62, and the level 14 can be pivoted into a vertical orientation as indicated by bubble tube 56. The nut then can be tightened with the support 12 and the level 14 in the FIG. 13 orientation. The apparatus 10 then can be moved substantially in this condition to another pitched rafter. The bottom face 26 of the support 12 can be placed on the top surface of the second pitched rafter and the position of the bubble in the tube 56 can be checked to determine whether the level 14 is plumb. If the level 14 is not plumb, then the worker knows that the second rafter is pitched differently from the first rafter. Adjustments then can be made to the pitch of the second rafter. This information can be useful for a worker who is trying to repair an old existing roof and/or to install a new section of roof. Additionally, the apparatus used as shown in FIG. 13 can enable the worker to properly position vertical studs relative to the pitched rafter 62.

Figure 14:
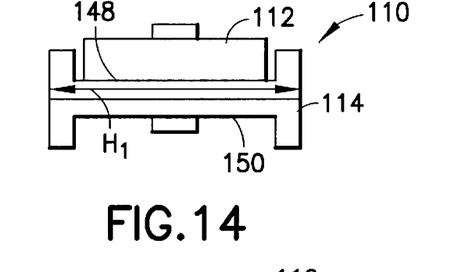
FIG. 14 is an end elevational view similar to FIG. 8, but showing an alternate embodiment.
Figure 15:
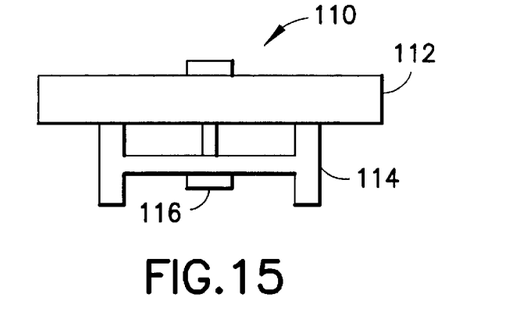
FIG. 15 is an end elevational view of the embodiment of FIG. 14, but showing the support member in a different angular orientation.
Figure 16:
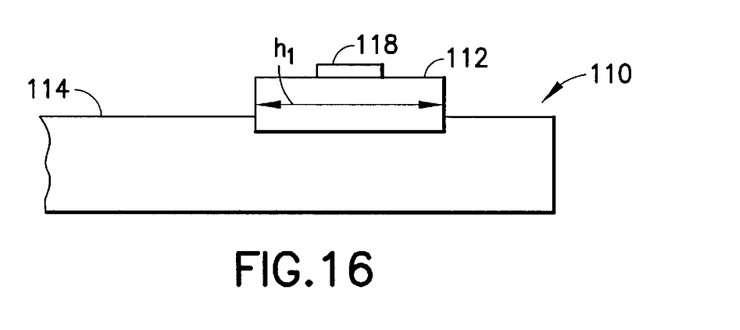
FIG. 16 is a top plan view of the embodiment depicted in FIG. 15.

The embodiments shown in FIGS. 1–13 includes a level 14 that is a rectangular parallelepiped. However, many prior art levels do not have a rectangular cross-section uniformly along their length, and there are advantages in the context of the subject invention for using a level that is not a rectangular parallelepiped. In this regard, FIGS. 14–16 show an apparatus 110 that has a support 112 substantially identical to the support 12 described and illustrated above. However, the apparatus 110 includes a level with front and rear faces 148 and 150 that are recessed. The support 112 defines a height "$h_1$" that is sufficiently less than the height "$H_1$" to permit the support 112 to be nested in the recessed front face 148 of the level 14. This will significantly reduce the cross-sectional dimensions of the apparatus 110 when the support 112 is parallel to the level 114. This difference can be appreciated by comparing the FIG. 8 depiction of the first embodiment to the FIG. 14 depiction of the second embodiment. The second embodiment of the apparatus 110 can be used by loosening the nut 118 on the bolt 116 and rotating the support into supporting engagement on the top and bottom flanges as shown in FIG. 15. Right angle orientation may be achievable easily by providing aligned notches in the top and bottom flanges of the level 14 that are dimensioned sufficiently for receiving the support 112 therein, as shown in FIG. 16. Other angular orientations, however, also can be achieved. The apparatus 110 can be used substantially in the manner shown with respect to the first embodiment of FIGS. 1–13.

Figure 17:
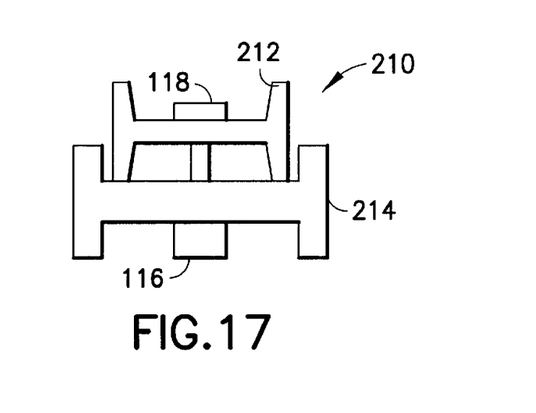

A third embodiment is illustrated in FIG. 17 and is identified generally by the numeral 210. The apparatus 210 shown in FIG. 17 includes a level 214 that is substantially identical to the level 114 shown in FIGS. 14 and 15. However, the support 212 assumes a cross-sectional configuration similar to but smaller than the level 214. This configuration for the support 214 can help to reduce the overall weight of the apparatus 110. More significantly, the configuration shown in FIG. 17 enables additional or other connecting structures to be positioned between the support 212 and the level 214. For example, a ratchet assembly can be positioned between the support 212 and the level 214 for defining certain specified angular orientations for the support 212 relative to the level 214. Additionally, springs can be employed for selectively biasing the racketing means into or out of engagement.

While the invention has been described with respect to a preferred embodiment, it is apparent that various changes can be made without departing from the scope of the invention. For example, other structures for pivotally connecting the support to the level can be provided. Additionally, the support need not be pivoted in close proximity to one end of the level. Rather, the level and the support each can be pivoted to one another at locations substantially centrally between their respective ends. This latter configuration may be particularly desirable for levels that are very short, such as like the conventional torpedo level that can be carried in a pocket or tool belt of the worker. This latter embodiment may slightly reduce the accuracy of results achieved with the level but can lead to improved efficiencies for certain instances. These and other variations will be apparent to a person skilled in the art after having read the subject disclosure.

What is claimed is:

1. An alignment apparatus comprising:

an elongate level defining a direction of elongation and having opposed first and second ends, planar parallel top and bottom faces extending between the ends and front and rear external faces extending between the ends and the top and bottom faces, said front and rear external faces facing outwardly on said level, portions of the front face adjacent the top and bottom faces being substantially parallel to one another to define a plane extending substantially parallel to the direction of elongation, a first bubble tube aligned substantially parallel to the direction of elongation for indicating a first gravitational orientation of said top and bottom faces of said level, a second bubble tube aligned substantially orthogonal to the direction of elongation for indicating a second gravitational orientation of said top and bottom faces of said level;

a support having opposed ends, at least a planar bottom face extending between the opposed ends and front and rear faces extending from said bottom face and between said ends, said support being pivotally connected to said front face of said level at a location substantially centrally between the ends of the support and at a location between said first end of said level and said bubble tubes, the pivotal connection of the support to the level being selectively tightenable at a selected pivotal orientation of said support relative to said level, the support extending beyond the plane defined by the front face of the level, and the level being free of structures spaced from said support and extending beyond said plane, such that said level can be suspended from a structural member by said support and oriented at a selected gravitational orientation with the front external face of the level in abutting facing relationship with a surface of the structural member.

2. The apparatus of claim 1, wherein the level and the support each include longitudinal axes extending between the respective ends thereof, the pivotal connection of the support to the level defining a pivot axis extending perpendicular to the longitudinal axes of the support and the level.

3. The apparatus of claim 2, wherein the bottom face of the support includes a length direction extending between the ends of the support and a thickness direction extending between the front and rear faces of the support, the thickness direction of the support being substantially parallel to the pivot axis.

4. The apparatus of claim 3, wherein the top and bottom faces of the level each define a level each define a length direction extending between the ends of the level and a thickness direction extending between the front and rear faces of the level, the thickness direction of the level extending substantially parallel to the pivot axis.

5. The apparatus of claim 2, wherein the pivot axis extends perpendicular to the front and rear faces of the level and perpendicular to the front and rear faces of the support.

6. The apparatus of claim 1, wherein the support is pivoted to the level at a location closer to one end of the level than to the opposed end thereof.

7. The apparatus of claim 6, wherein the support is pivoted to said level at a location spaced from said one end by a distance no greater than one-half the distance between the ends of the support.

8. The apparatus of claim 1, wherein the support further includes a substantially planar top face extending substantially parallel to the bottom face.

9. The apparatus of claim 1, wherein the front and rear faces of the support are spaced from one another by a distance of at least 0.75 inch.

10. The apparatus of claim 1, wherein the front face of the level and the rear face of the support are substantially planar and are in face-to-face sliding contact with one another.

11. The apparatus of claim 1, wherein at least the front face of the level includes a longitudinally extending recess, said support being receivable in said recess of said level when said bottom face of said support is aligned parallel to said top and bottom faces of said level.

12. The apparatus of claim 11, wherein the rear face of the support includes at least one recess aligned to surround at least said pivotal connection of said support to said level.

13. The apparatus of claim 12, further comprising means in said recesses between said support and said level for selectively engaging said support in any of a plurality of angular orientations relative to said level.

14. The apparatus of claim 11, wherein at least one of the front face of the level and the rear face of the support are configured for selective engagement with one another in a selected angular orientation.

15. The apparatus of claim 14, wherein the selected angular orientation is such that the top and bottom faces of the level are perpendicular to the bottom face of the support.

16. The apparatus of claim 2, wherein the support and the level are on opposite respective sides of a plane extending perpendicular to the pivot axis.

17. The apparatus of claim 1, wherein the bottom face of the support extends from the level a distance sufficient for engaging a top surface of a substantially horizontal beam and supporting the apparatus therefrom.

* * * * *